Oct. 8, 1968
C. F. BENSON ET AL
3,404,760
SHEET METAL ROLLER CAGE FOR CLUTCH
Filed Oct. 24, 1965
2 Sheets-Sheet 1
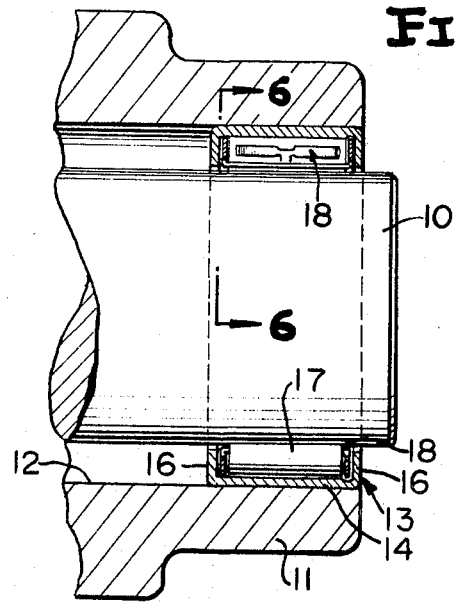
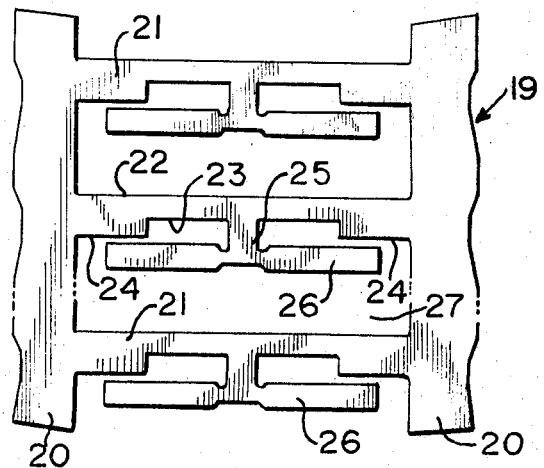
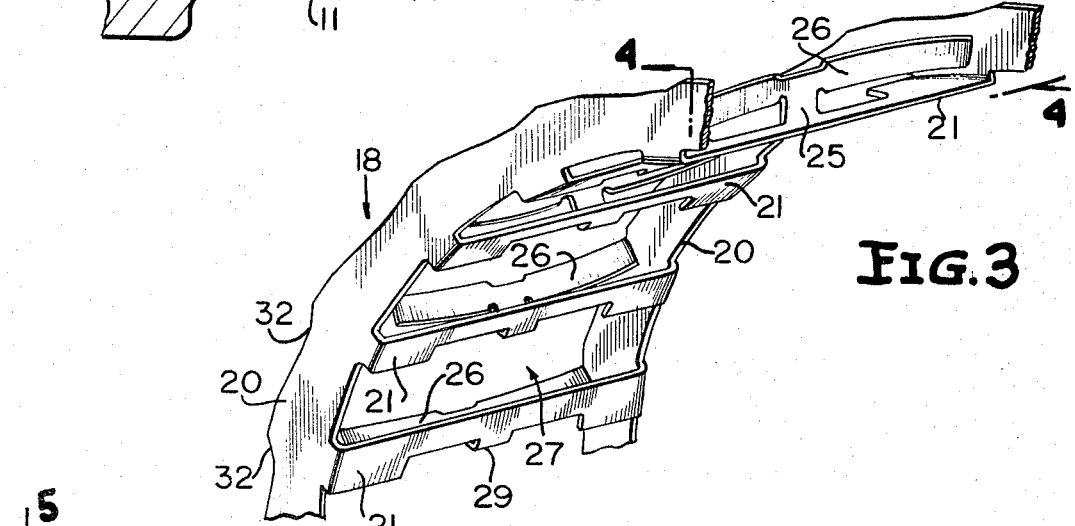
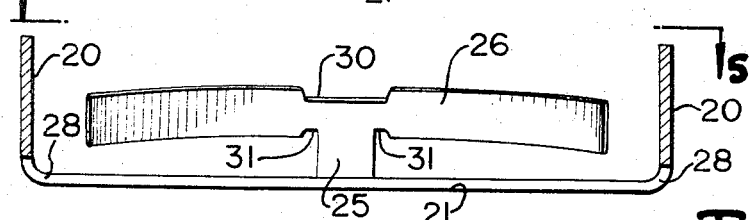
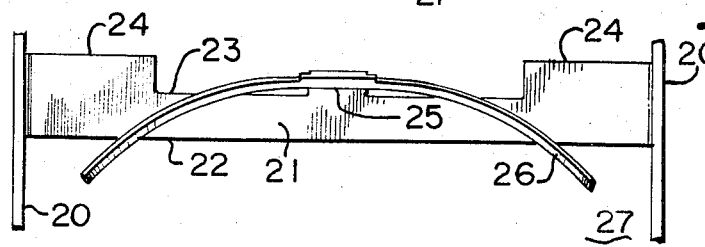
INVENTORS
CARL BENSON &
JOHN H. COWLES
ATTORNEYS Oct. 8, 1968  C. F. BENSON ET AL  3,404,760
SHEET METAL ROLLER CAGE FOR CLUTCH
Filed Oct. 24, 1965  2 Sheets-Sheet 2
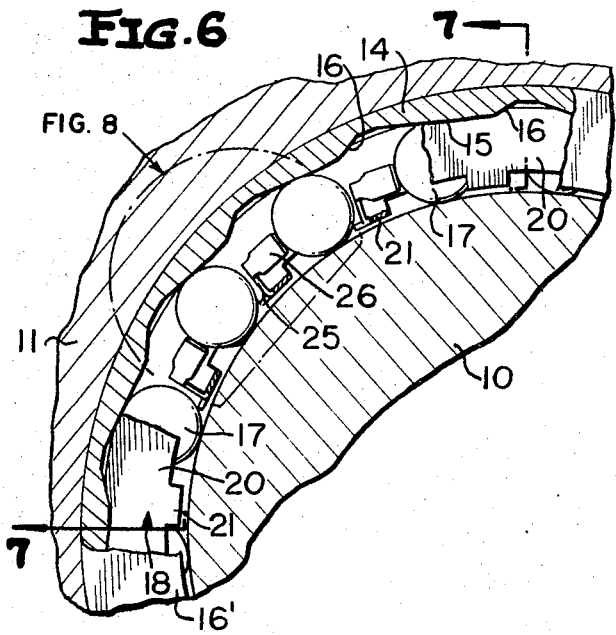
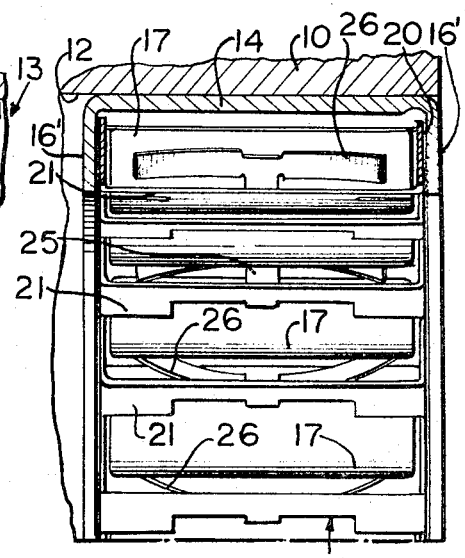
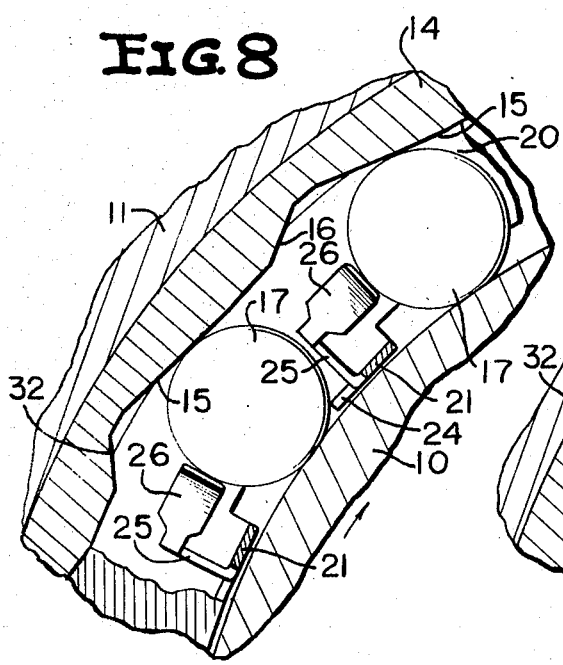
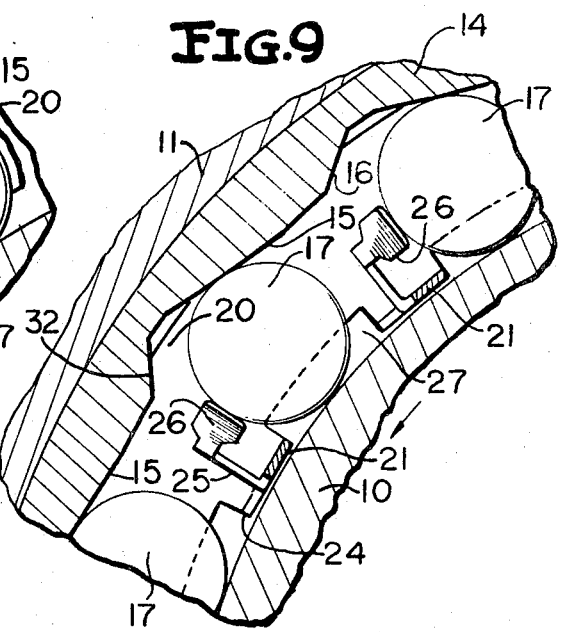
INVENTORS
CARL BENSON &
JOHN H. COWLES
BY Mason, Porter, Diller & Brown
ATTORNEYS United States Patent Office 3,404,760
Patented Oct. 8, 1968

3,404,760
SHEET METAL ROLLER CAGE FOR CLUTCH
Carl F. Benson, Torrington, and John H. Cowles, Forestville, Conn., assignors to The Torrington Company, Torrington, Conn., a corporation of Maine
Filed Oct. 24, 1965, Ser. No. 504,962
11 Claims. (Cl. 192—45)

ABSTRACT OF THE DISCLOSURE

This disclosure has to do with a retainer for an overrunning roller clutch. The retainer is of a one-piece sheet metal construction and the principal feature thereof is that the springs thereof are formed from the material normally removed in the forming of the roller receiving windows, each spring being arcuate in outline axially of the retainer and being integrally connected to an associated bar by means of a radially extending tab.

---

This invention relates in general to new and useful improvements in overrunning roller clutches, and more particularly to a novel retainer therefor.

This invention particularly relates to a retainer for use in an overrunning roller clutch of the type wherein the clutch is formed of an outer clutch member having a multi-cam inner surface with there being one roller for each cam surface and the rollers being retained relative to the cam surfaces by means of a retainer. In one direction of relative rotation of a shaft which is directly receivable within the clutch, the clutch permits the free wheeling of the shaft and the machine element in which the clutch is mounted, and in the opposite direction of rotation of the shaft, the clutch locks the shaft to the machine member. Such clutches are desirably relatively inexpensive and inasmuch as the retainer must not only retain the rollers in spaced relation, but also spring load the rollers so that they may effectively operate as a part of the clutch, the retainer is relatively complicated. It is, accordingly, the primary object of this invention to provide a novel retainer for rollers of an overrunning roller clutch wherein the retainer is of a construction wherein it may be formed at a minimum of cost so as to hold the cost of the entire clutch to a minimum.

Another object of this invention is to provide a novel retainer for overrunning roller clutches wherein the retainer may be readily stamped from a strip of sheet metal by a repeated stamping operation and wherein a stamped strip may be cut to length and then reshaped to a circular configuration so as to define a cylindrical retainer.

Still another object of this invention is to provide a novel retainer for overrunning roller clutches wherein the retainer is readily formed from sheet metal and wherein the dimension of the metal required for the forming of the retainer corresponds substantially to the axial length of the retainer plus twice the width of the rims of the retainer whereby a minimum of material is required in the forming of the retainer.

A still further object of this invention is to provide a novel sheet metal, one-piece retainer for overrunning roller clutches wherein the construction of the retainer is extremely simple so as to be economically feasible and at the same time is of a nature wherein it fully performs the intended function thereof at all times under normal operating conditions.

With the above and other objects in view that will hereinafter appear, the nature of the invention will be more clearly understood by reference to the following detailed description, the appended claims and the several views illustrated in the accompanying drawings;

In the drawings:

FIGURE 1 is a fragmentary sectional view showing a conventional use of an overrunning clutch positioned between a shaft and a machine element.

FIGURE 2 is a fragmentary plan view of the blank strip from which the retainer of the clutch of FIGURE 1 is formed.

FIGURE 3 is a fragmentary perspective view of the retainer.

FIGURE 4 is an enlarged fragmentary sectional view taken along the line 4—4 of FIGURE 3.

FIGURE 5 is an enlarged fragmentary view taken generally along the line 5—5 of FIGURE 4.

FIGURE 6 is an enlarged fragmentary sectional view taken along the line 6—6 of FIGURE 1.

FIGURE 7 is a fragmentary sectional view taken generally along the line 7—7 of FIGURE 6.

FIGURE 8 is an enlarged portion of the assembly of FIGURE 6 generally within the phantom line area identified as FIG. 8, with the clutch in its operative position.

FIGURE 9 is a sectional view similar to FIGURE 8 and shows the clutch in its released position.

Referring to the drawings in detail, it will be seen that there is illustrated in FIGURE 1 a conventional application of an overrunning roller clutch of the type to which this invention relates. There is illustrated a shaft 10 which is suitably mounted for relative rotation with respect to a machine element 11. The machine element 11 has a bore 12 into which there is pressed an overrunning roller clutch, generally referred to by the numeral 13. The clutch has received therethrough the shaft 10.

The overrunning roller clutch 13 includes an outer clutch member 14 which, for purposes of economy, is preferably formed of sheet metal. The outer clutch member 14, as is best shown in FIGURE 6, includes an inner surface which is embossed to define a plurality of cam surfaces 15. At one end of each of the cam surfaces 15, the inner surface of the outer clutch member 14 is configurated to define a shoulder 16. The outer clutch member 14 also includes a pair of radial lips or flanges 16'.

A roller 17 is aligned with each of the cam surfaces 15. The rollers 17 are of a diameter wherein they are loosely positioned between the shaft 10 and the respective cam surface 15 in one relative position of the rollers with respect to the outer clutch member 14 and are tightly wedged between the cam surfaces 15 and the shaft 10 in a second relative position of the rollers with respect to the outer clutch member. In order to control the relative positions of the rollers 17 with respect to the outer clutch member 14, there is provided a retainer which is the subject of this invention and which is generally referred to by the numeral 18.

The retainer 18 is formed from an elongated strip of sheet metal which is first shaped to define a blank 19 which blank is shown in FIGURE 2. The blank 19 is contoured by punching to define two elongated straps or rims 20 which are disposed on the opposite edges of the blank 20 and which are connected together by equally spaced cross bars 21. Each cross bar 21 is provided with a continuous edge 22 along one side thereof and the opposite edge is of a recessed configuration to define a recessed central edge portion 23 and two terminal edge portions 24 which are in alignment with one another. A tab 25 projects from the center of each recessed edge portion 23 and the opposite end of the tab 25 carries an integral spring 26 of which the central portion is coextensive with the tab 25. In the blank form, all of the components are coplanar and the tab 25 and the spring 26 project into a generally rectangular opening or window 27 which is defined by the edges of two adjacent cross bars 21 and the straps or rims 20.

In the forming of the retainer 18 from the blank 19, the blank is folded along the end portions of the cross bars 21 whereby the rims 20 are disposed substantially normal to the cross bars 21 and are connected thereto by relatively sharp radii 28. The tabs 25 are also bent relative to the cross bars 24 so as to be disposed substantially normal thereto and are connected to the cross bars 21 by means of relatively sharp radii 29. The spring 26 is bent so as to be of a generally arcuate contour as is clearly shown in FIGURE 5. The blank 19 is further bent so that the rims 20 thereof have a generally circular outline and the remote ends of the rims 20 meet and are welded together. The resultant retainer 18 is of a cylindrical configuration.

It is to be noted that the retainer 18 has the rims 20 thereof lying in radial planes with the cross bars 21 connected to the inner edges thereof. The tabs 25 extend radially outwardly from the cross bars 21 with the springs 26 being positioned between the two rims 20. It is also to be noted that the springs 26 lie generally within the radial projections of the respective cross bars and open towards the interrupted edge of the next adjacent cross bar 21.

The windows 27 are of a size smaller than the diameter of rollers 17 and the edge portions 24 define seats or stops for the rollers. The springs 26 project into the radial projections of the windows 27 with the spacing between the ends of a spring and the adjacent edge portions 24 being less than the diameter of a roller 17. Furthermore, the springs 26 lie generally in centered relation with respect to the pitch circle of the rollers 17 whereby they engage the rollers 17 substantially in center relation to the pitch circle. Under storage conditions, the springs 26 hold the rollers 17 seated against the seats defined by the edge portions 24.

At this time, it is pointed out that while each spring 26 is coextensive with respect to the corresponding tab 25, the edge of the spring 26 remote from the tab 25 may be recessed or notched as at 30 generally in alignment with the tab 25. Furthermore, the edge of the spring 26 to which the tab 25 is connected may be notched as at 31 on opposite sides of the tab 25. By controlling the depth of the notches 30 and 31, the relative stiffness of the spring 26 may be controlled. Also, the spring 26 may be tapered along its length either in thickness by coining or in width by a blanking operation to control the relative stiffness.

When the retainer 18 with its roller 17 complement is assembled with the outer clutch member 14, it is fixed against relative rotation. To this end, the outer surface of each rim 20 is contoured generally to conform with the contour of the inner surface of the outer clutch member 14 and to include a plurality of circumferentially spaced shoulders 32 which are adapted to abut the shoulder 16 of the outer clutch member 14 and restrict rotation of the retainer 18 in a counterclockwise direction relative to the outer clutch member 14 as viewed in FIGURES 6, 8 and 9.

It is to be understood that although the retainer 18 is formed of sheet metal, in its final form the metal of the retainer will have sufficient resiliency so that the springs 26 will properly function while the over-all retainer is shape retaining. The springs 26 will now serve to hold the rollers in place by clamping the rollers 17 against the seats defined by the edge portions 24 of the cross bars 21. Normally, the retainer 18 will be subject to a heat treatment after the formation thereof to harden the surfaces thereof.

It is to be understood that one of the lips or flanges 16' of the outer clutch member 14 is bent to its radial position after the retainer 18 has been assembled within the outer clutch member 14.

In the utiliziation of the overruning roller clutch 13, the clutch is assembled by pressing the outer clutch member 14 into the bore 12 of the machine element 11. The shaft 10 is then passed through the clutch 13.

Referring now to FIGURE 8 in particular, it will be seen that the springs 26 urge the rollers in a circumferential direction opposite to the direction which the cam surfaces 15 face. At this time the reaction of the rollers 17 on the springs 26 tightly forces the shoulders 32 on the retainer rims against the shoulders or stop surfaces 16 of the outer clutch member 14. The springs 26 thus tend to constantly urge the rollers 17 into wedged relation between the shaft 10 and the cam surface 15 of the outer clutch member 14. When the shaft 10 attempts to rotate in a clockwise direction relative to the outer clutch member 14 and the machine element 11, as viewed in FIGURE 8, the rollers 17 are urged into more tightly wedged relation between the shaft 10 and the outer clutch member 14 and the shaft 10 is locked to the machine element 11 through the outer clutch member 14 by the rollers 17.

When the shaft 10 is rotated in a counterclockwise direction relative to the outer clutch member 14 and the machine element 11, as is shown in FIGURE 9, the rollers 17 will have a tendency to move in a counterclockwise direction relative to the outer clutch member 14 and will move against the resistance of the springs 26 to positions wherein the rollers 17 are not tightly wedged between the cam surfaces 15 of the outer clutch member 14 and the shaft 10, and rotation of the shaft 10 in a counterclockwise direction relative to the machine element 11 is permitted.

From the description of the retainer 18, it will be readily apparent that the retainer 18 may be cheaply mass produced utilizing a minimum of material. It will also be apparent that for a given roller diameter, utilizing the same blank strip, retainers of different diameters may be formed. It will also be apparent that inasmuch as the retainers are formed of reltively strong sheet metal, the retainers will have long life. Furthermore, it will be readily apparent that the retainers will have sufficient strength to perform the necessary functions.

Although only a preferred embodiment of the invention has been specifically illustrated and described here, it is to be understood that minor variations may be made in the disclosed retainer without departing from the spirit and scope of the invention, as defined by the appended claims.

We claim:

1. A one-piece sheet metal retainer for an overrunning roller clutch comprising a pair of axially spaced annular rims, a plurality of circumferentially spaced cross bars extending axially between said rims and together with said rims defining roller receiving windows, a radially extending tab projecting from each cross bar, and a spring integrally formed with each tab and connected thereto at the end of the tab remote from the associated cross bar, said spring being arcuate in outline and having a central portion connected to said tab, and said springs lying between said rims and being generally radially aligned with the respective cross bar.

2. The retainer of claim 1 wherein said spring central portion is coextensive with said tab.

3. The retainer of claim 1 wherein each tab extends from an edge of the respective cross bar and each spring opens towards that edge of the next adjacent cross bar.

4. The retainer of claim 1 wherein one edge of each cross bar is centrally recessed to define a recessed central edge portion and two projecting edge portions, each tab extending from a recessed central edge portion and each spring opening towards the projecting edge portions of an adjacent cross bar with said projecting edge portions defining roller seats cooperable with a respective one of said springs to normally position a roller.

5. The retainer of claim 4 wherein each window is of a lesser width than the diameter of rollers for which said retainer is provided and each spring projects into a radial projection of an adjacent window.

6. The retainer of claim 1 wherein said springs are centered on the roller pitch circle of the retainer.

7. The retainer of claim 1 wherein said rims lie in radial planes and said cross bars are slightly radially inwardly offset from said rims and connected thereto by sharp radii.

8. The retainer of claim 7 wherein each rim has a contoured outer edge particularly adapted for interlocking engagement with cam surfaces of an outer clutch member.

9. The retainer of claim 1 wherein said springs are formed from material displaced in the formation of said windows.

10. The retainer of claim 1 wherein said spring central portion is coextensive with said tab, and said spring is notched on opposite sides of said tab to control the strength thereof.

11. The retainer of claim 1 wherein the arcuate outline of each spring is axially of said retainer.

References Cited

UNITED STATES PATENTS

| | | | |
|---|---|---|---|
| 2,753,027 | 2/1956 | Troendly et al. | 192—45.1 |
| 3,055,472 | 9/1962 | Sauzedde | 192—45 |
| 3,118,525 | 1/1964 | Fischer | 192—45 |
| 3,184,020 | 5/1965 | Benson et al. | 192—45 |
| 3,241,641 | 3/1966 | Cowles | 192—45 |

BENJAMIN W. WYCHE III, *Primary Examiner.*